(12) United States Patent
Narain

(10) Patent No.: US 10,419,290 B2
(45) Date of Patent: Sep. 17, 2019

(54) SYSTEMS AND METHODS OF IN-BAND NETWORK CONFIGURATION

(71) Applicant: Vencore Labs, Inc., Basking Ridge, NJ (US)

(72) Inventor: Sanjai Narain, Basking Ridge, NJ (US)

(73) Assignee: Perspecta Labs Inc., Basking Ridge, NJ (US)

( * ) Notice: Subject to any disclaimer, the term of this patent is extended or adjusted under 35 U.S.C. 154(b) by 504 days.

(21) Appl. No.: 15/199,256

(22) Filed: Jun. 30, 2016

(65) Prior Publication Data

US 2017/0141955 A1 May 18, 2017

Related U.S. Application Data

(60) Provisional application No. 62/188,359, filed on Jul. 2, 2015.

(51) Int. Cl.
*H04L 12/24* (2006.01)
*H04L 12/749* (2013.01)
*H04L 29/06* (2006.01)

(52) U.S. Cl.
CPC ........ *H04L 41/082* (2013.01); *H04L 41/0813* (2013.01); *H04L 41/12* (2013.01); *H04L 45/741* (2013.01); *H04L 69/18* (2013.01)

(58) Field of Classification Search
CPC ... H04L 41/082; H04L 41/0813; H04L 41/12; H04L 45/741; H04L 69/18; H04L 41/0843; H04L 43/08; H04L 67/10; H04L 12/413; H04L 12/6418; H04L 41/0853; H04L 41/0869; H04L 43/0823; H04L 51/00; H04L 63/0428; H04L 63/08; H04L 63/18; H04L 63/20; H04L 41/24; H04L 43/04; H04L 43/0876; H04L 47/70; H04L 12/58; H04L 29/06; H04L 67/18; H04L 67/34; H04L 69/24; H04L 69/329; H04L 61/2084; H04L 29/12311; H04L 61/2007; H04L 61/6059; H04L 69/16; H04L 69/167; H04L 69/22; H04L 67/1097; H04W 88/06; H04W 36/0016; H04W 36/0022; H04W 36/04; H04W 48/18; H04W 48/16; H04W 8/22;
(Continued)

(56) References Cited

U.S. PATENT DOCUMENTS

2003/0140129 A1* 7/2003 Livnat ................ H04L 29/06
709/221
2006/0271647 A1* 11/2006 Tindall ............... H04L 41/0843
709/220

(Continued)

*Primary Examiner* — Chris Parry
*Assistant Examiner* — Abderrahmen Chouat
(74) *Attorney, Agent, or Firm* — Heslin Rothenberg Farley & Mesiti P.C.

(57) ABSTRACT

A method, computer system, and computer program product include identifying, by one or more processors, a node in a network, where the node includes an incorrect configuration, where the incorrect configuration is a configuration utilized by a first communications protocol for communication with the node, and where the node includes another configuration utilized by a second communications protocol, for communication with the node. The one or more processors utilize the second communications protocol and the other configuration to access the node over the network and reconfigure the node to update the incorrect configuration to a new configuration.

15 Claims, 5 Drawing Sheets

(58) Field of Classification Search
CPC ....... H04W 8/245; H04W 48/10; H04W 4/02;
H04W 8/005; H04W 8/183; H04W 36/14;
H04W 40/02; H04W 80/04; H04W 88/16;
H04W 8/085; H04W 8/26; H04W 92/02;
H04W 28/16; H04W 76/22; H04W 84/04;
G06F 2209/508; G06F 9/5038; G06F
9/5066; G06F 13/1642; G06F 13/1689;
G06F 13/28; G06F 13/362; G06F 13/364;
G06F 13/4031; G06F 2203/0338; G06F
3/03547; G06F 8/61; G06F 8/65; G06F
8/71
See application file for complete search history.

(56) References Cited

U.S. PATENT DOCUMENTS

| | | | | |
|---|---|---|---|---|
| 2010/0128602 | A1* | 5/2010 | Tucker | H04W 36/28 370/225 |
| 2013/0303148 | A1* | 11/2013 | Karaoguz | H04L 41/0843 455/418 |
| 2014/0334314 | A1* | 11/2014 | Fredriksson | H04J 3/07 370/242 |
| 2016/0007258 | A1* | 1/2016 | Singh | H04W 36/18 455/437 |
| 2017/0078925 | A1* | 3/2017 | Widebrant | H04W 36/0022 |

* cited by examiner

SYSTEMS AND METHODS OF IN-BAND NETWORK CONFIGURATION

CROSS-REFERENCE TO RELATED APPLICATIONS

This application claims priority to U.S. Provisional Application No. 62/188,359 filed Jul. 2, 2015, entitled, "SYSTEMS AND METHODS OF IN-BAND NETWORK CONFIGURATION" which is incorporated herein by reference in its entirety.

STATEMENT REGARDING FEDERALLY SPONSORED RESEARCH OR DEVELOPMENT

This invention was made with government support under contract number FA8750-13-C-0030 awarded by the U.S. Air Force Research Laboratory of U.S. Department of Defense. The government has certain rights in the invention.

FIELD OF INVENTION

The invention relates generally to systems and methods of in-band configuration of a network, including, in-band configuration via dynamic routing and a reverse breadth-first search and fast In-band network configuration with a logical out-of-band network.

BACKGROUND OF INVENTION

Current methods of reconfiguring data networks often include sending the configuration updates over an out-of-band network. However, an out-of-band network increases both capital expenditures (CAPEX) such as expenditures incurred when a business spends money either to buy fixed assets or to add to the value of an existing fixed asset with a useful life extending beyond the taxable year, and operating expenditure (OPEX), the cost of developing or providing non-consumable parts for the product or system. Reconfiguration without an out-of-band network may be particularly desirable in a distributed network model, for example, in a Distributed Assured and Dynamic Configuration (DADC) model.

SUMMARY OF INVENTION

Shortcomings of the prior art are also overcome and additional advantages are provided through the provision of a method for re-configuring a network in-band. The method includes: identifying, by one or more processors, a node in a network, wherein the node comprises an incorrect configuration, wherein the incorrect configuration comprises a configuration utilized by a first communications protocol for communication with the node, and wherein the node comprises another configuration utilized by a second communications protocol, for communication with the node; utilizing, by the one or more processors, the second communications protocol and the other configuration to access the node over the network; and reconfiguring, by the one or more processors, the node to update the incorrect configuration to a new configuration.

Systems and methods relating to one or more aspects of the technique are also described and may be claimed herein. Further, services relating to one or more aspects of the technique are also described and may be claimed herein.

Additional features are realized through the techniques of the present invention. Other embodiments and aspects of the invention are described in detail herein and are considered a part of the claimed invention.

BRIEF DESCRIPTION OF DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawing.

DETAILED DESCRIPTION OF THE INVENTION

Figure 1:
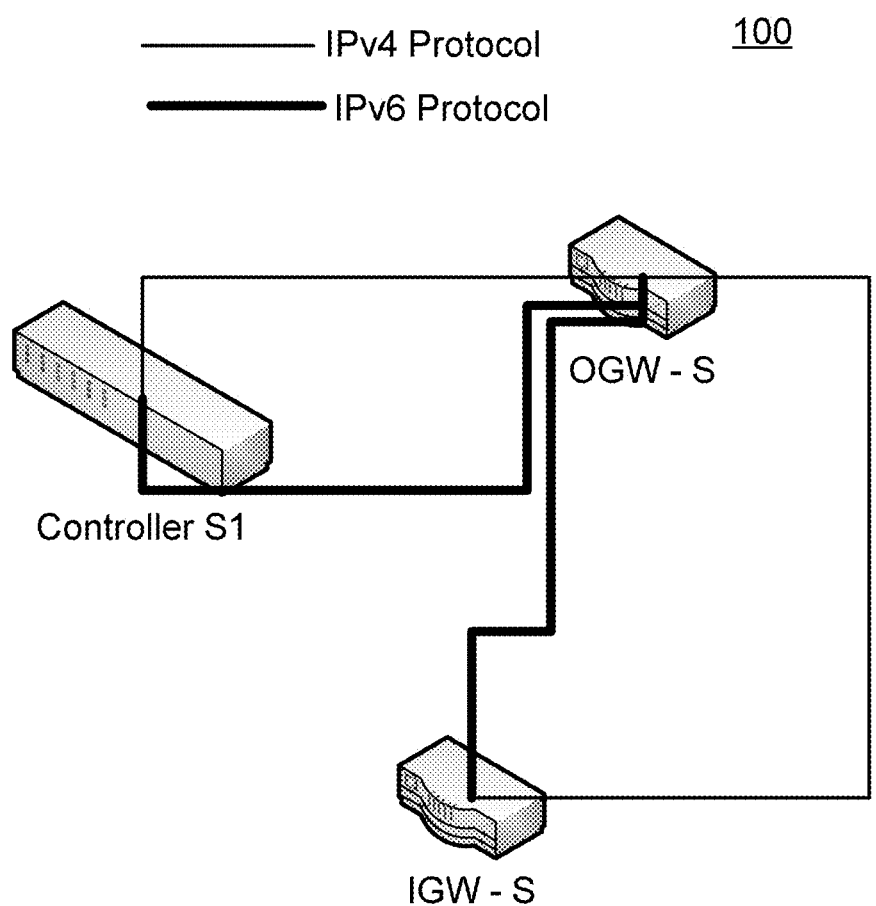
FIG. 1 depicts a technical architecture that demonstrates aspects of an embodiment of the present invention.

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. The terms software and program code are used interchangeably throughout this application. Program code may refer to one or more programs.

A common way of reconfiguring a data network is to send configuration updates over an out-of-band network. However, an out-of-band network increases both CAPEX and OPEX. The present invention includes at least two methods for eliminating the requirement of an out-of-band network in order to reconfigure an existing network. Instead, both systems and methods utilize methods of reconfiguring a given network in-band. A need for such a network that can be reconfigured in-band, i.e., without relying upon sending configuration updates over an out-of-band network. This type of system and method may include using the data network itself to carry updates. Once challenge to utilizing the data in a given network to carry configuration updates is that if the updates are done in the wrong order, components can be disconnected before they are updated.

Embodiments of the present invention provide a system and method for performing in-band network configuration with a logical out-of-band network. To this end, certain embodiments of the present invention use a logical out-of-band network that does not use any extra physical resources, yet permits the configuration of the data network without risk of incorrect configuration update order. To enable this type of configuration, the network that is to be configured is comprised on nodes that support more than one communications protocol, where the communications protocols are independent of each other, meaning that communications between the nodes utilizing a first protocol would not affect communications over the network utilizing the second protocol. An example of two protocols that can be utilized in an embodiment of the present invention are Internet Protocol version 4 (IPv4) and Internet Protocol version 6 (IPv6). Each protocol is a communications protocol that provides an identification and location system for computers on networks and routes traffic across the Internet. IPv4 uses 32-bit (four-byte) addresses, which limits the address space to 4294967296 (232) addresses. Meanwhile, IPv6 uses a 128-bit address, theoretically allowing 2**128, or approximately 3.4*10**38 addresses (the actual number is slightly smaller, as multiple ranges are reserved for special use or completely excluded from use). The two protocols are not designed to be interoperable, and in fact, specialized transition mechanisms are required to permit communication between IPv4 and IPv6 hosts. As understood by one of skill in the art, IPv4 and IPv6 are just one example of independent communications protocols that can be utilized by the same hardware and/or software nodes on a network.

In an embodiment of the present invention, program code implements a configurations in-band by utilizing one or two independent protocols that can operate within the same network as a back channel network. Thus, program code can re-configure the nodes over a back channels without the need for additional physical network resources, as would be required for an out-of-band configuration change. As aforementioned, in an example where the two protocols are IPv4 and IPv6, the network is a dual-stack of these protocols (i.e., a front channel and a back channel over the same nodes), a configuration or misconfiguration in one network does not affect the operation of the other. In an embodiment of the present invention, by separating the protocols into different channels, at least one controller may configure a data network using what can be understood as a logically separate overlay control network.

Initially, in order to reconfigure nodes of a network, in an embodiment of the present invention, program code sets up the aforementioned back channel by enabling the network nodes that regularly communicate using a first protocol, to also communicate via a second protocol. In this example, the first protocol is IPv4 and the second is IPv6. However, as understood by one of skill in the art, any two independent protocols can be utilized provided that they are both supported by the existing nodes of the network. In an embodiment of the present invention, program code sets up an IPv6 network (i.e., a backchannel, a separate overlay control network) over an existing IPv4 network. Thus, over an IPv4 network, program code (e.g., executing on a controller) connects to each node on the network and to add an IPv6 address to each interface to each node, and also enable IPv6 routing on that interface. The program code enables routing in such a way that the controller can reach all nodes over the IPv6 network. Because IPv4 reachability is unaffected by IPv6 configurations, the program code can enable IPv6 routing while the regular functionality of the IPv4 can proceed in parallel.

Once program code establishes (at least) a dual-stack of protocols over as existing network, aspects of certain embodiments of the present invention provide advantages over other out-of-band and other in-band configuration methods because the program code in certain embodiments of the present invention can configure the nodes of the network, working in-band, in any order, without disrupting the functionality of the network. For example, embodiments of the present invention perform in-band configuration of a network by utilizing a network utilizing one protocol (e.g., an IPv6 network) to configure the network utilizing the second protocol (e.g., an IPv4 network), and vice versa. In an embodiment of the present invention, program code, executed on at least one controller, utilizes an IPv6 network to connect to each node and change the IPv4 configuration of each node. The configuration change does not affect the functionality of the network or the nodes on the network because IPv4 configurations do not affect IPv6 reachability. Thus, in an embodiment of the present invention, the program code can change the configurations of the nodes in any order, and in parallel, without disrupting the functionality of the network, greatly increasing the reconfiguration efficiency.

Certain embodiments of the present invention may be utilized in networks with the following logical back channel deployments: 1) IPv4 data network with IPv6 logical back channel; and/or 2) IPv6 data network with IPv4 logical back channel. When utilizing these certain embodiments, a computer architecture that supports the logical back channel may include: 1) dual-stack IPv4-IPv6 capable network equipment; and 2) ability to dedicate either the IPv4 or IPv6 network for control channel use.

Network 100 of FIG. 1 illustrates the use of a logical out-of-band network to accomplish in-band network configuration, in accordance with aspects of the present invention. In the network 100 depicted in FIG. 1, the network enclave shown to the left of the WAN router illustrates certain aspects. The data network 100 uses IPv4 addresses but the Controller-S1 connects to the enclave routers OGW-S and IGW-S over an IPv6 network that runs the RIP routing protocol. By using the IPv6 network, Controller-S1 is able to reconfigure the IPv4 configurations of these routers in any sequence without losing its connectivity to the routers. Thus, this logical backchannel requires no additional physical resources.

Figure 2:
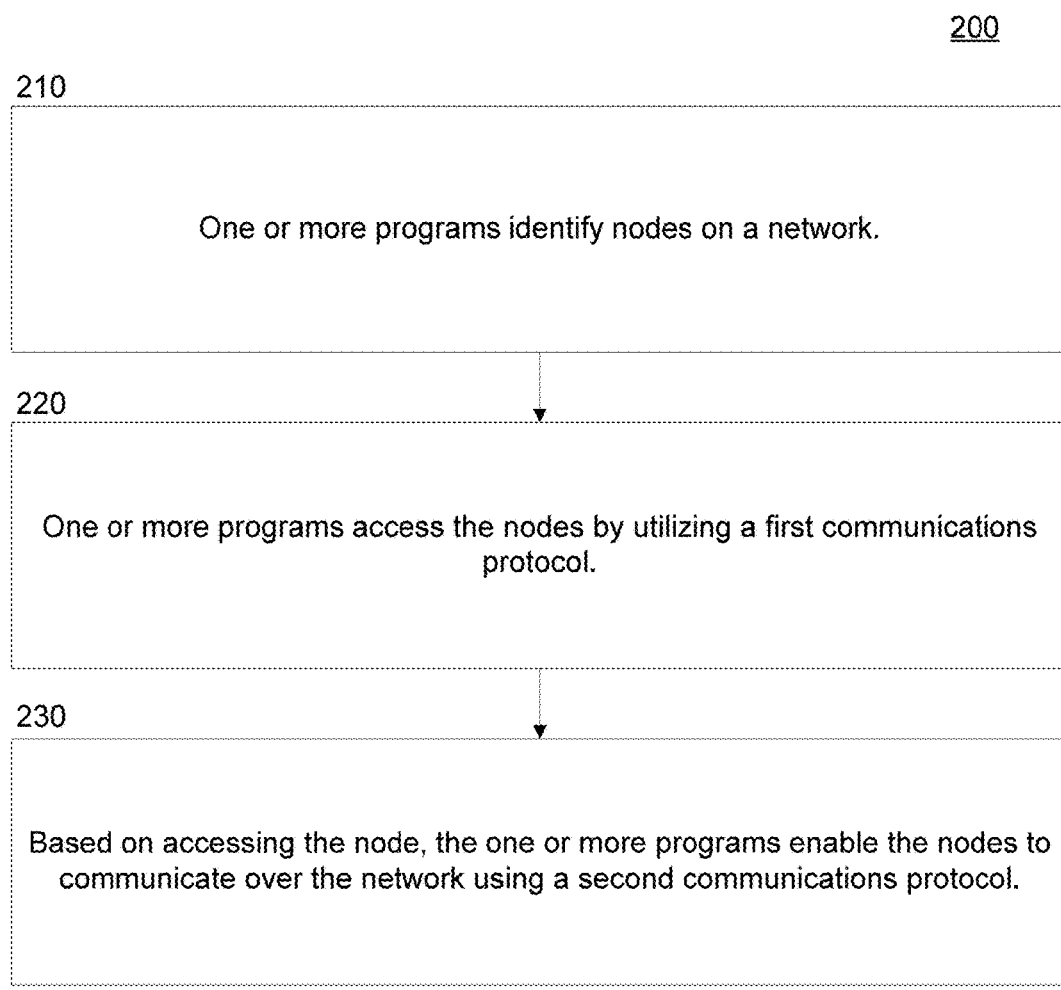
FIG. 2 is a workflow that illustrates aspects of an embodiment of the present invention.

FIG. 2 is a workflow 200 illustrating aspects of an embodiment of the present invention, specifically, the initial setup of a dual-stack of protocol, i.e., the addition of a backchannel or a separate overlay control network to an existing network, where the existing network communicates utilizing a first communications protocol and the backchannel or separate overlay control network communicates utilizing a second communications protocol. In an embodiment of the present invention, program code (e.g., executing on a network controller) identifies nodes on a network (210). The program code accesses the nodes by utilizing a first communications protocol (220). Based on accessing the node, the program code enables the nodes to communicate over the network using a second communications protocol (230). In an embodiment of the present invention, enabling the nodes to communicate utilizing the second communications protocol includes adding an address to each node (e.g., adding an address to the interface of each node) accessible with the second communications protocol. In an embodiment of the present invention, the enabling includes enabling routing utilizing the second protocol (e.g., via the newly-addressed interface) on the nodes. In an embodiment of the present invention either the first or the second protocol is IPv4 and the remaining protocol in IPv6.

Figure 3:
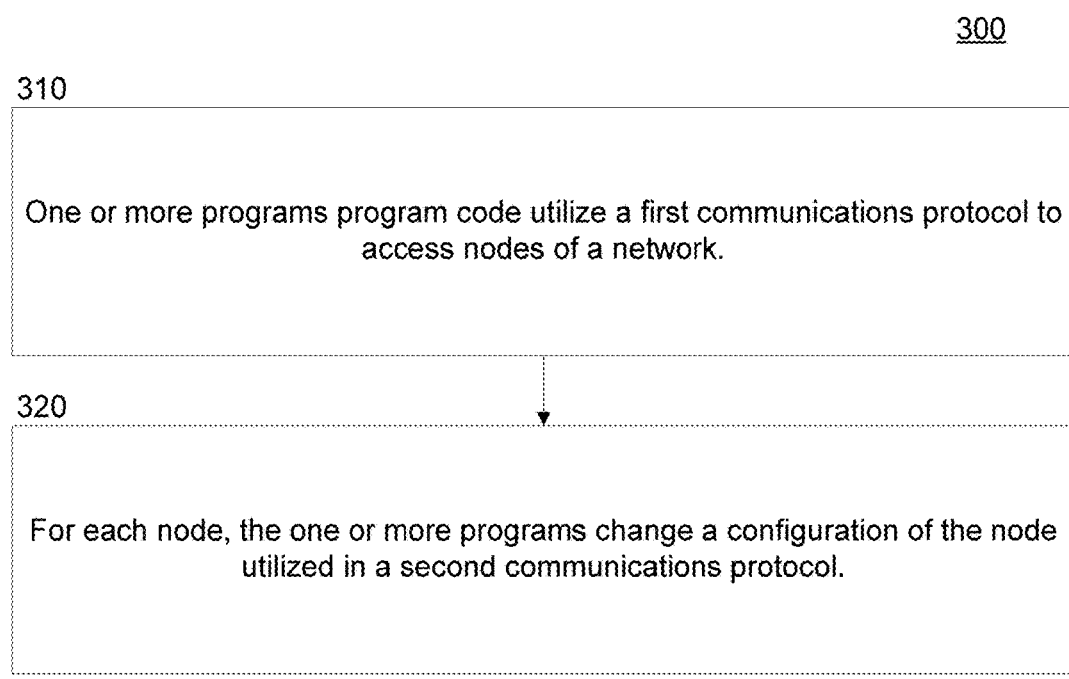
FIG. 3 is a workflow that illustrates aspects of an embodiment of the present invention.

FIG. 3 is a workflow 300 that illustrates certain aspects of an embodiment of the present invention including the reconfiguration of the nodes of a network in accordance with an embodiment of the present invention. In an embodiment of the present invention, program code utilizes a first communications protocol to access nodes of a network (310). For each node, the program code changes a configuration of the node utilized in a second communications protocol (320). In an embodiment of the present invention, the program code changes the configurations without disrupting communications utilizing the first protocol. In an embodiment of the present invention either the first or the second protocol is IPv4 and the remaining protocol in IPv6. In an embodiment of the present invention, the program code configures the nodes in a randomly selected order without disrupting communications utilizing the first protocol. In an embodiment of the present invention, the program code configures more than one node in parallel. In an embodiment of the present invention, the program code identified a network with a first protocol further that includes a back channel with a second protocol and the program code configures first node of the network by utilizing the second protocol without affecting connectivity of the first node to a second node, wherein the connectivity of the first node to the second node is established utilizing the first protocol.

Thus, as illustrated in FIGS. 2-3 and discussed herein, aspects of an embodiment of the present invention include a method reconfiguring a network in-band that includes program code identifying a node in a network, where the node includes an incorrect configuration, where the incorrect configuration includes a configuration utilized by a first communications protocol for communication with the node, and where the node includes another configuration utilized by a second communications protocol, for communication with the node. The program code utilizes the second communications protocol and the other configuration to access the node over the network and reconfigures the node to update the incorrect configuration to a new configuration. In an embodiment of the present invention, the node is a router.

In an embodiment of the present invention, the program code communicates with the node by utilizing the first communications protocol and the new configuration. In an embodiment of the present invention, concurrent with the reconfiguring, the program code communicates with the node utilizing the second communications protocol.

In an embodiment of the present invention, the program code may also identify a second node in a network, where the second node includes a second incorrect configuration, where the second incorrect configuration is a configuration utilized by the first communications protocol for communication with the second node, and where the second node includes a second configuration utilized by the second communications protocol, for communication with the second node. The program code utilizes the second communications protocol to access the second node over the network and concurrent with reconfiguring the initial node, the program code also reconfigures the second node to update the incorrect configuration to a second new configuration. In an embodiment of the present invention, the first communications protocol and the second communications protocol are wireless communications protocols.

In an embodiment of the present invention, prior to the identifying the node, the program code enables the node for communications utilizing the second communications protocol. To enable this node, the program code accesses the node utilizing the first communications protocol and alters features on the node to enable communications with the node utilizing the second communications protocol. In an embodiment of the present invention, this altering of features may include adding an address to an interface of the node, where the address is accessible with the second communications protocol and adjusting, at least one setting on the node to enable routing utilizing the second communications protocol, via the interface. The program code may then communicate over the network, with the node, by utilizing the second communications protocol.

In an embodiment of the present invention, the first communications protocol and the second communications protocol are different protocols and are each selected from the group consisting of: Internet Protocol version 4 (IPv4) and Internet Protocol version 6 (IPv6).

Figure 4:
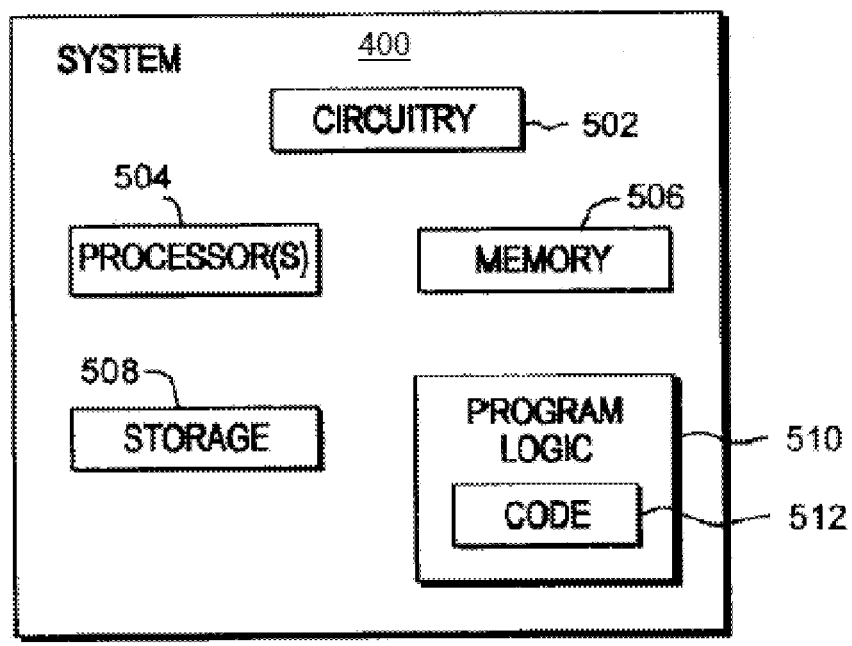
FIG. 4 depicts a computer system configured to perform an aspect of an embodiment of the present invention.
Figure 5:
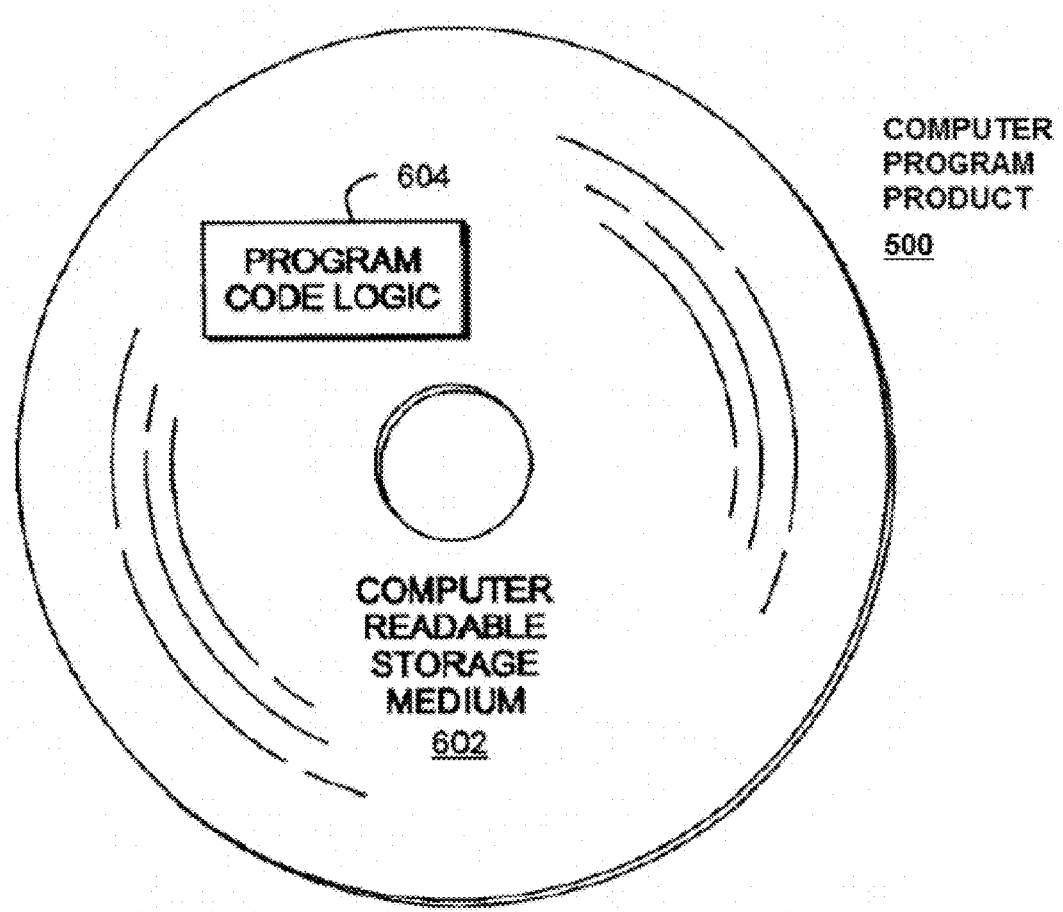
FIG. 5 depicts a computer program product incorporating one or more aspects of the present invention.

FIG. 4 and FIG. 5 are relevant to the systems and methods discussed in this disclosure. FIG. 4 illustrates a block diagram of a resource in computer system, such the nodes, which may comprise a controller and/or a router, in networks reconfigured in accordance with embodiments of the present invention. Returning to FIG. 4, the resource 400 may include a circuitry 502 that may in certain embodiments include a microprocessor 504. The computer system 400 may also include a memory 506 (e.g., a volatile memory device), and storage 508. The storage 508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 508 may comprise an internal storage device, an attached storage device and/or a network accessible storage device. The system 400 may include a program logic 510 including code 512 that may be loaded into the memory 506 and executed by the microprocessor 504 or circuitry 502.

In certain embodiments, the program logic 510 including code 512 may be stored in the storage 508, or memory 506. In certain other embodiments, the program logic 510 may be implemented in the circuitry 502. Therefore, while FIG. 4 shows the program logic 510 separately from the other elements, the program logic 510 may be implemented in the memory 506 and/or the circuitry 502. The program logic 510 may include the program code discussed in this disclosure that facilitates the reconfiguration of elements of various computer networks, including those in various figures.

Using the processing resources of a resource 400 to execute software, computer-readable code or instructions, does not limit where this code can be stored. Referring to FIG. 5, in one example, a computer program product 500 includes, for instance, one or more non-transitory computer readable storage media 602 to store computer readable program code means or logic 604 thereon to provide and facilitate one or more aspects of the technique.

As will be appreciated by one skilled in the art, aspects of the technique may be embodied as a system, method or computer program product. Accordingly, aspects of the technique may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the technique may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the technique may be written in any combination of one or more programming languages, including an object oriented programming language, such as Java, Smalltalk, C++ or the like, and conventional procedural programming languages, such as the "C" programming language, PHP, ASP, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the technique are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions, also referred to as software and/or program code, may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the technique. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the technique may be provided, offered, deployed, managed, serviced, etc. by a service provider who offers management of customer environments. For instance, the service provider can create, maintain, support, etc. computer code and/or a computer infrastructure that performs one or more aspects of the technique for one or more customers. In return, the service provider may receive payment from the customer under a subscription and/or fee agreement, as examples. Additionally or alternatively, the service provider may receive payment from the sale of advertising content to one or more third parties.

In one aspect of the technique, an application may be deployed for performing one or more aspects of the technique. As one example, the deploying of an application comprises providing computer infrastructure operable to perform one or more aspects of the technique.

As a further aspect of the technique, a computing infrastructure may be deployed comprising integrating computer readable code into a computing system, in which the code in combination with the computing system is capable of performing one or more aspects of the technique.

As yet a further aspect of the technique, a process for integrating computing infrastructure comprising integrating computer readable code into a computer system may be provided. The computer system comprises a computer readable medium, in which the computer medium comprises one or more aspects of the technique. The code in combination with the computer system is capable of performing one or more aspects of the technique.

Further, other types of computing environments can benefit from one or more aspects of the technique. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the technique, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or steps plus function elements in the descriptions below, if any, are intended to include any structure, material, or act for performing the function in combination with other elements as specifically noted. The description of the technique has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular uses contemplated.

The invention claimed is:

1. A method for reconfiguring a network in-band comprising:
   transmitting, by one or more processors, communications among a plurality of nodes over a first channel of a network, wherein the first channel is configured to transmit communications in a first communications protocol between the plurality of nodes, wherein each node of the plurality of nodes comprises a first address, and wherein the communications are transmitted between the plurality of nodes in the first communications protocol, based on utilizing the first address;
   concurrent with the transmitting, enabling, by a controller on the network, over the first channel of the network utilizing the first communications protocol, the plurality of nodes for transmitting communications in a second communications protocol between the plurality of nodes over a second channel of the network, wherein the plurality of nodes are accessible to the controller via the first communications protocol and via the second communications protocol, the enabling comprising:
      accessing, by the controller, the plurality of nodes over the first channel of the network, utilizing the first communications protocol; and
      configuring, by the controller, the plurality of nodes to communicate over the network on the second channel utilizing the second communications protocol, wherein the configuring comprises adding a second address to each node of the plurality of nodes, wherein based on the configuring, the plurality of nodes commence transmitting communications between the plurality of nodes over the second channel, in the second communications protocol, based on utilizing the second address;
   transmitting, by the one or more processors, communications among the plurality of nodes over the second channel of the network;
   concurrent with transmitting the communications among the plurality of nodes over the second channel of the network, identifying, by the controller, over the first channel, a node of the plurality of nodes, wherein the node comprises an incorrect first address;
   repairing, by the controller, the communications between the plurality of nodes over the first channel involving the node, the repairing comprising:
      utilizing, by the controller, the second communications protocol over the second channel and the second address of the node to access the node over the network; and
      reconfiguring, by the controller, in-band over the second channel of the network, the node to update the first address; and based on the repairing, resuming, by the one or more processors, communications between the plurality of nodes over the second channel involving the node.

2. The method of claim 1, wherein transmitting the communications among the plurality of nodes over the second channel of the network comprises:
concurrent with the reconfiguring, communicating, by the one or more processors, with the node utilizing the second communications protocol.

3. The method of claim 1, further comprising:
concurrent with transmitting the communications among the plurality of nodes over the second channel of the network, identifying, by the controller, over the first channel, a second node of the plurality of nodes, wherein the second node comprises an incorrect first address;
repairing, by the controller, the communications between the plurality of nodes over the first channel involving the second node, the repairing comprising:
utilizing, by the controller, the second communications protocol over the second channel and the second address of the second node to access the second node over the network; and
reconfiguring, by the controller, in-band over the second channel of the network, the second node to update the first address of the second node, wherein the reconfiguring of the second node is concurrent to the reconfiguring of the node; and
based on the repairing, resuming, by the one or more processors, communications between the plurality of nodes over the second channel involving the second node.

4. The method of claim 1, wherein the first communications protocol and the second communications protocol are wireless communications protocols.

5. The method of claim 1, wherein adding the second address to each node comprises adding the second address to an interface of the node, and wherein configuring the plurality of nodes to communicate over the network on the second channel utilizing the second communications protocol further comprises:
adjusting, by the one or more processors, at least one setting on each node of the plurality of nodes to enable routing utilizing the second communications protocol, via the interface.

6. The method of claim 1, wherein the first communications protocol and the second communications protocol comprise different protocols and are selected from the group consisting of: Internet Protocol version 4 (IPv4) and Internet Protocol version 6 (IPv6).

7. The method of claim 1, wherein the first communications protocol and the second communications protocol comprise different protocols and are selected from the group consisting of: Internet Protocol version 4 (IPv4) and Internet Protocol version 6 (IPv6).

8. A computer program product comprising:
a non-transitory computer readable storage medium readable by one or more processors and storing instructions for execution by the one or more processors for performing a method comprising:
transmitting, by the one or more processors, communications among a plurality of nodes over a first channel of a network, wherein the first channel is configured to transmit communications in a first communications protocol between the plurality of nodes, wherein each node of the plurality of nodes comprises a first address, and wherein the communications are transmitted between the plurality of nodes in the first communications protocol, based on utilizing the first address;
concurrent with the transmitting, enabling, by a controller on the network, over the first channel of the network utilizing the first communications protocol, the plurality of nodes for transmitting communications in a second communications protocol between the plurality of nodes over a second channel of the network, wherein the plurality of nodes are accessible to the controller via the first communications protocol and via the second communications protocol, the enabling comprising:
accessing, by the controller, the plurality of nodes over the first channel of the network, utilizing the first communications protocol; and
configuring, by the controller, the plurality of nodes to communicate over the network on the second channel utilizing the second communications protocol, wherein the configuring comprises adding a second address to each node of the plurality of nodes, wherein based on the configuring, the plurality of nodes commence transmitting communications between the plurality of nodes over the second channel, in the second communications protocol, based on utilizing the second address;
transmitting, by the one or more processors, communications among the plurality of nodes over the second channel of the network;
concurrent with transmitting the communications among the plurality of nodes over the second channel of the network, identifying, by the controller, over the first channel, a node of the plurality of nodes, wherein the node comprises an incorrect first address;
concurrent with transmitting the communications among the plurality of nodes over the second channel of the network, repairing, by the controller, the communications between the plurality of nodes over the first channel involving the node, the repairing comprising:
utilizing, by the controller, the second communications protocol over the second channel and the second address of the node to access the node over the network; and
reconfiguring, by the controller, in-band over the second channel of the network, the node to update the first address; and
based on the repairing, resuming, by the one or more processors, communications between the plurality of nodes over the second channel involving the node.

9. The computer program product of claim 8, wherein transmitting the communications among the plurality of nodes over the second channel of the network comprises:
concurrent with the reconfiguring, communicating, by the one or more processors, with the node utilizing the second communications protocol.

10. The computer program product of claim 8, the method further comprising:
concurrent with transmitting the communications among the plurality of nodes over the second channel of the network, identifying, by the controller, over the first channel, a second node of the plurality of nodes, wherein the second node comprises an incorrect first address;
concurrent with transmitting the communications among the plurality of nodes over the second channel of the network, repairing, by the controller, the communications between the plurality of nodes over the first channel involving the second node, the repairing comprising:

utilizing, by the controller, the second communications protocol over the second channel and the second address of the second node to access the second node over the network; and reconfiguring, by the controller, in-band over the second channel of the network, the second node to update the first address of the second node, wherein the reconfiguring of the second node is concurrent to the reconfiguring of the node; and based on the repairing, resuming, by the one or more processors, communications between the plurality of nodes over the second channel involving the second node.

11. The computer program product of claim 8, wherein the first communications protocol and the second communications protocol are wireless communications protocols.

12. The computer program product of claim 8, wherein adding the second address to each node comprises adding the second address to an interface of the node, and wherein configuring the plurality of nodes to communicate over the network on the second channel utilizing the second communications protocol further comprises:

adjusting, by the one or more processors, at least one setting on each node of the plurality of nodes to enable routing utilizing the second communications protocol, via the interface.

13. The computer program product of claim 12, wherein the node comprises a router.

14. The computer program product of claim 8, wherein the first communications protocol and the second communications protocol comprise different protocols and are selected from the group consisting of: Internet Protocol version 4 (IPv4) and Internet Protocol version 6 (IPv6).

15. A system comprising:

a memory;

one or more processors in communication with the memory; and program instructions executable by the one or more processors via the memory to perform a method, the method comprising:

transmitting, by the one or more processors, communications among a plurality of nodes over a first channel of a network, wherein the first channel is configured to transmit communications in a first communications protocol between the plurality of nodes, wherein each node of the plurality of nodes comprises a first address, and wherein the communications are transmitted between the plurality of nodes in the first communications protocol, based on utilizing the first address;

concurrent with the transmitting, enabling, by a controller on the network, over the first channel of the network utilizing the first communications protocol, the plurality of nodes for transmitting communications in a second communications protocol between the plurality of nodes over a second channel of the network, wherein the plurality of nodes are accessible to the controller via the first communications protocol and via the second communications protocol, the enabling comprising:

accessing, by the controller, the plurality of nodes over the first channel of the network, utilizing the first communications protocol; and configuring, by the controller, the plurality of nodes to communicate over the network on the second channel utilizing the second communications protocol, wherein the configuring comprises adding a second address to each node of the plurality of nodes, wherein based on the configuring, the plurality of nodes commence transmitting communications between the plurality of nodes over the second channel, in the second communications protocol, based on utilizing the second address;

transmitting, by the one or more processors, communications among the plurality of nodes over the second channel of the network;

concurrent with transmitting the communications among the plurality of nodes over the second channel of the network, identifying, by the controller, over the first channel, a node of the plurality of nodes, wherein the node comprises an incorrect first address;

concurrent with transmitting the communications among the plurality of nodes over the second channel of the network, repairing, by the controller, the communications between the plurality of nodes over the first channel involving the node, the repairing comprising:

utilizing, by the controller, the second communications protocol over the second channel and the second address of the node to access the node over the network; and reconfiguring, by the controller, in-band over the second channel of the network, the node to update the first address; and based on the repairing, resuming, by the one or more processors, communications between the plurality of nodes over the second channel involving the node.

* * * * *